(12) United States Patent
Tamai et al.

(10) Patent No.: US 8,060,267 B2
(45) Date of Patent: Nov. 15, 2011

(54) METHOD FOR CONTROLLING POWER FLOW WITHIN A POWERTRAIN SYSTEM

(75) Inventors: Goro Tamai, West Bloomfield, MI (US); Anthony James Corsetti, Royal Oak, MI (US); Anthony H. Heap, Ann Arbor, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 600 days.

(21) Appl. No.: 12/251,419

(22) Filed: Oct. 14, 2008

(65) Prior Publication Data
US 2009/0105896 A1   Apr. 23, 2009

Related U.S. Application Data

(60) Provisional application No. 60/981,899, filed on Oct. 23, 2007.

(51) Int. Cl.
*B60W 10/04* (2006.01)
*G06F 17/00* (2006.01)

(52) U.S. Cl. .............. 701/22; 180/65.21; 180/65.31

(58) Field of Classification Search .............. 701/22, 701/36, 51; 180/65.21–65.31; 477/2–7
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,074,157 B2 * | 7/2006 | Wakashiro et al. | 477/7 |
| 7,154,236 B1 | 12/2006 | Heap | |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |

(Continued)

*Primary Examiner* — Richard M. Camby

(57) ABSTRACT

A method for operating a powertrain system includes monitoring a state of charge of an energy storage device and determining an effective state of charge based upon the monitored state of charge of the energy storage device and a range of available power from the energy storage device. A preferred output power to an output member is determined. A preferred charge state for operating the powertrain is concurrently selected with operating an engine in one of a cylinder deactivation state and an all-cylinder state based upon the effective state of charge and the preferred output power to the output member.

15 Claims, 4 Drawing Sheets

U.S. PATENT DOCUMENTS

| | | |
|---|---|---|
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |

| | | | | | | |
|---|---|---|---|---|---|---|
| 2009/0118939 | A1 | 5/2009 | Heap | 2009/0118951 A1 | 5/2009 | Heap |
| 2009/0118940 | A1 | 5/2009 | Heap | 2009/0118952 A1 | 5/2009 | Heap |
| 2009/0118941 | A1 | 5/2009 | Heap | 2009/0118954 A1 | 5/2009 | Wu |
| 2009/0118942 | A1 | 5/2009 | Hsieh | 2009/0118957 A1 | 5/2009 | Heap |
| 2009/0118943 | A1 | 5/2009 | Heap | 2009/0118962 A1 | 5/2009 | Heap |
| 2009/0118944 | A1 | 5/2009 | Heap | 2009/0118963 A1 | 5/2009 | Heap |
| 2009/0118945 | A1 | 5/2009 | Heap | 2009/0118964 A1 | 5/2009 | Snyder |
| 2009/0118946 | A1 | 5/2009 | Heap | 2009/0118969 A1 | 5/2009 | Heap |
| 2009/0118947 | A1 | 5/2009 | Heap | 2009/0118971 A1 | 5/2009 | Heap |
| 2009/0118948 | A1 | 5/2009 | Heap | 2009/0118999 A1 | 5/2009 | Heap |
| 2009/0118949 | A1 | 5/2009 | Heap | 2009/0144002 A1 | 6/2009 | Zettel |
| 2009/0118950 | A1 | 5/2009 | Heap | | | |

* cited by examiner

METHOD FOR CONTROLLING POWER FLOW WITHIN A POWERTRAIN SYSTEM

CROSS REFERENCE TO RELATED APPLICATION

This application claims the benefit of U.S. Provisional Application No. 60/981,899 filed on Oct. 23, 2007 which is hereby incorporated herein by reference.

TECHNICAL FIELD

This disclosure is related to hybrid powertrain systems control.

BACKGROUND

The statements in this section merely provide background information related to the present disclosure and may not constitute prior art.

Known powertrain architectures include torque-generative devices, including internal combustion engines and torque machines that transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque output to the driveline, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes a multi-cylinder engine coupled to an input member of a hybrid transmission operative to transfer power between the input member, first and second torque machines, and an output member. The first and second torque machines are connected to an energy storage device. The engine is selectively operative in an all-cylinder state and a cylinder deactivation state. The powertrain is selectively operative in one of a plurality of charge states. A method for operating the powertrain system includes monitoring a state of charge of the energy storage device and determining an effective state of charge based upon the monitored state of charge of the energy storage device and a range of available power from the energy storage device. A preferred output power to the output member is determined. A preferred charge state for operating the powertrain is concurrently selected with operating the engine in one of the cylinder deactivation state and the all-cylinder state based upon the effective state of charge and the preferred output power to the output member.

BRIEF DESCRIPTION OF THE DRAWINGS

One or more embodiments will now be described, by way of example, with reference to the accompanying drawings, in which.

DETAILED DESCRIPTION

Figure 1:
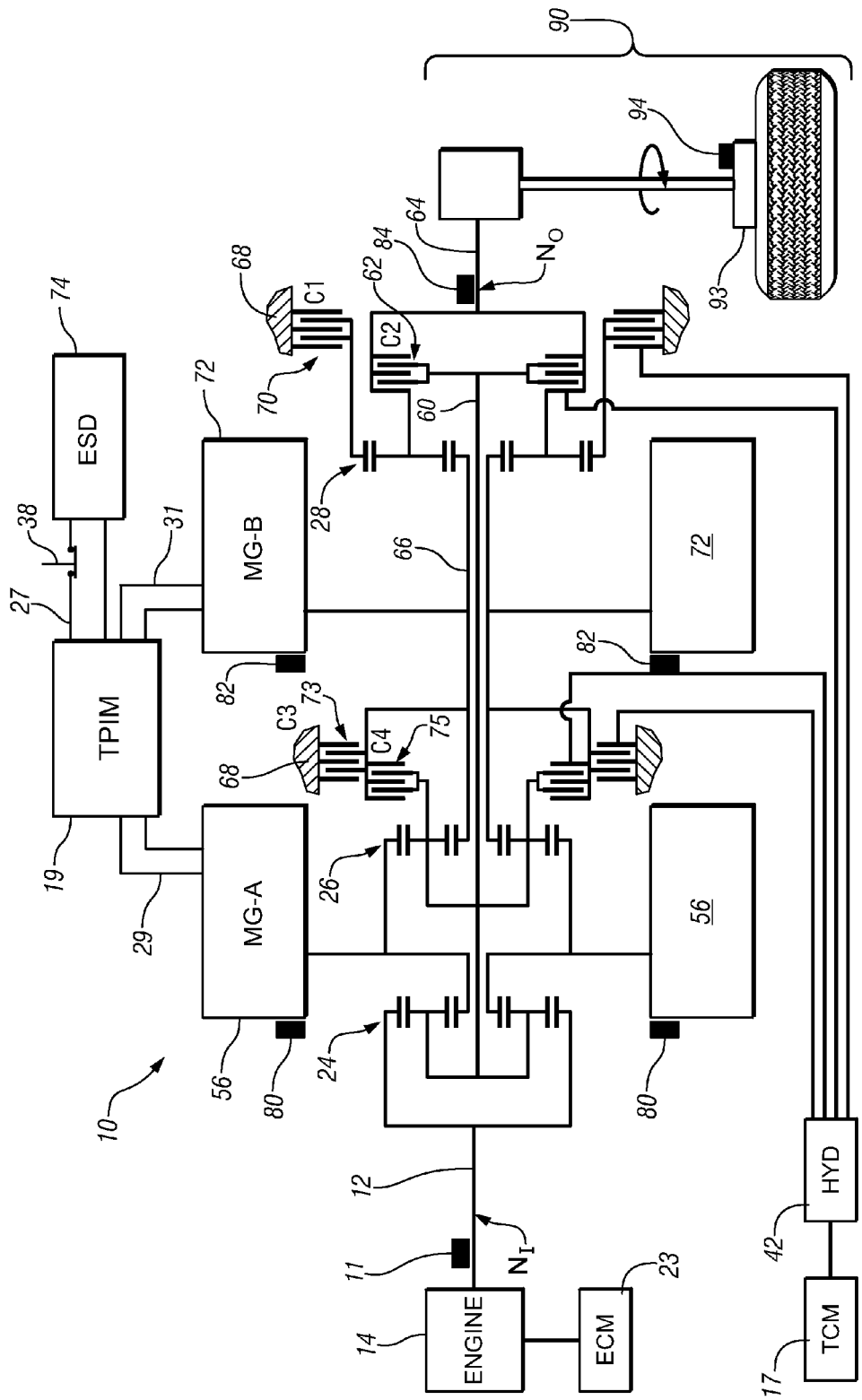
FIG. 1 is a schematic diagram of an exemplary powertrain, in accordance with the present disclosure.
Figure 2:
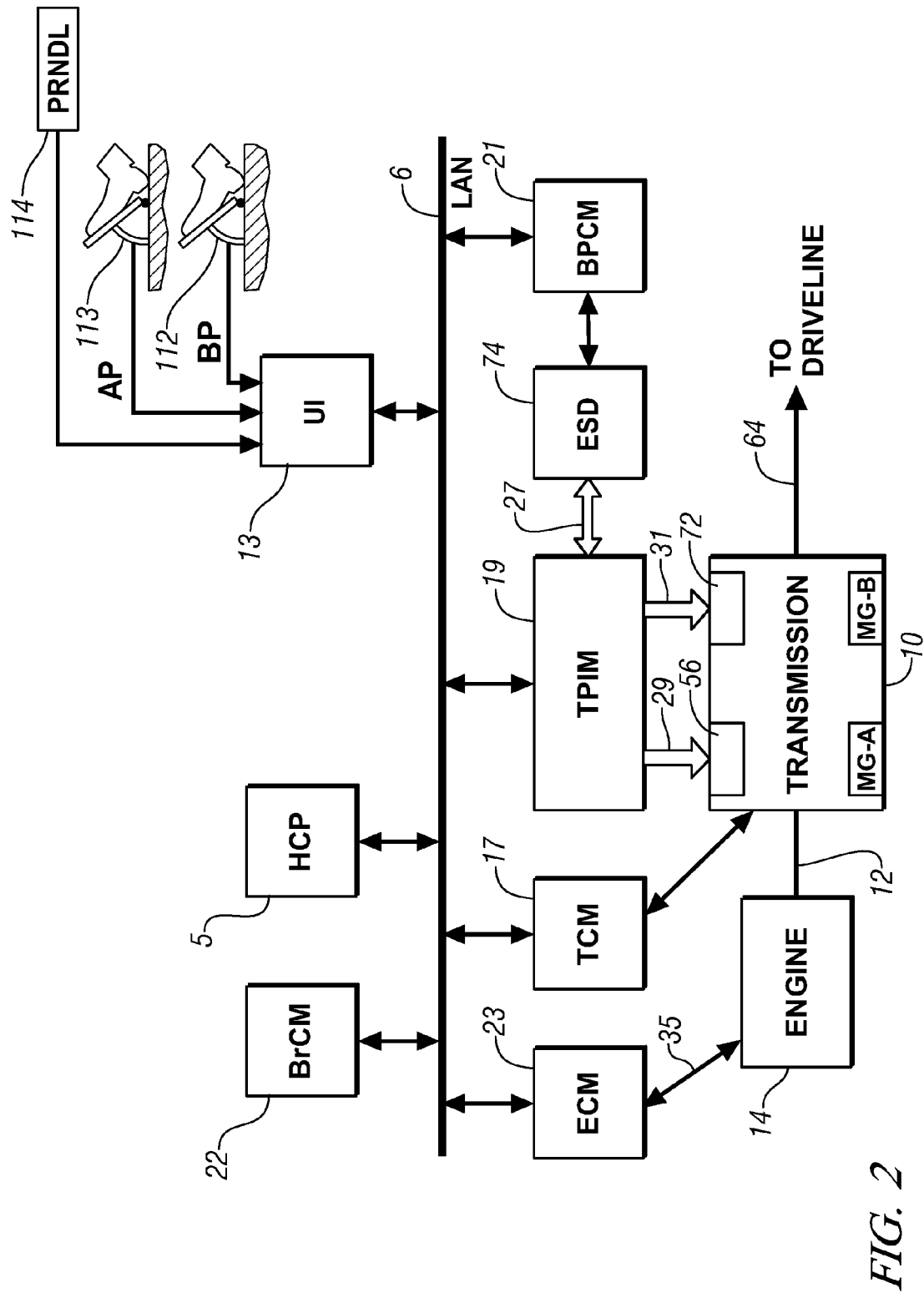
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 14 and torque machines comprising first and second electric machines ('MG-A') 56 and ('MG-B') 72. The engine 14 and the torque machines comprising the first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed N, and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19 and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power provided to the driveline 90 is in response to an output torque command based upon an operator torque request. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine 14 is unfueled and the engine input speed to the input member 12 is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

The exemplary powertrain system can transition between engine states to actively manage fueling of the engine 14 and can operate the transmission 10 in fixed gear and continuously variable operating range states. Engine states include one of the engine-on state and the engine-off state, one of an all-cylinder state and a cylinder deactivation state, and one of a fueled state and a fuel cutoff state. When the engine 14 is operating in the cylinder deactivation state, a portion of the engine cylinders are deactivated and unfueled. In an exemplary embodiment wherein the engine 14 includes eight combustion cylinders, the engine 14 operates by combusting fuel in all eight cylinders when the engine is in the all-cylinder state and operates by combusting fuel in four cylinders when the engine is operating in the cylinder deactivation state. However, other exemplary engines which can be utilized herein include other types of multi-cylinder engines for example, four cylinder, six cylinder, and twelve cylinder engines.

The HCP 5 determines engine commands during one of the control loop cycles. The engine commands include engine states and a preferred engine operating point. The preferred engine state and the preferred engine operating point can be determined utilizing a cost calculation, in which operating costs are generally determined based upon factors that include vehicle driveability, fuel economy, emissions, and battery usage. Costs are assigned and associated with fuel and electrical power consumption and are associated with a specific operating point of the hybrid powertrain. Lower operating costs are generally associated with lower fuel consumption at high conversion efficiencies, lower battery power usage, and lower emissions for each engine speed/load operating point, and take into account the present engine state. In one embodiment, when the preferred transmission operating range state is a continuously variable operating mode, i.e., M1 or M2, the engine operating point comprises input speed $N_I$ and engine torque $T_I$. In one embodiment, when the preferred transmission operating range state is a fixed gear operating mode i.e., G1, G2, G3, or G4, the engine operating point includes engine torque $T_I$.

The HCP 5 determines transmission commands including changing the operating range state during one of the control loop cycles. Commanding changing the operating range state includes commanding execution of a change in the operating range state if the preferred operating range state is different from the present operating range state by commanding changes in application of one or more of the clutches C1 70, C2 62, C3 73, and C4 75 and other transmission commands. The present operating range state and an input speed profile can be determined. The input speed profile is an estimate of an upcoming time-rate change in the input speed and preferably comprises a scalar parametric value that is a targeted input speed for the forthcoming loop cycle, based upon the engine operating commands and the operator torque request during a transition in the operating range state of the transmission. When the transmission 10 is in one of the continuously variable operating modes, i.e. EVT Mode M1, or M2, the ratio of input torque $T_I$ from the engine 14 to output torque $T_O$ from the transmission 10 can be controlled by controlling motor torques $T_A$ and $T_B$ transmitted between the transmission 10 and the first and second electric machines 56 and 72. In an alternate embodiment, the ratio of input torque from the engine 14 to the transmission 10 can be controlled by controlling a continuously variable gear-ratio of the transmission 10, by for example, modifying a diameter of a variable diameter pulley.

Figure 3:
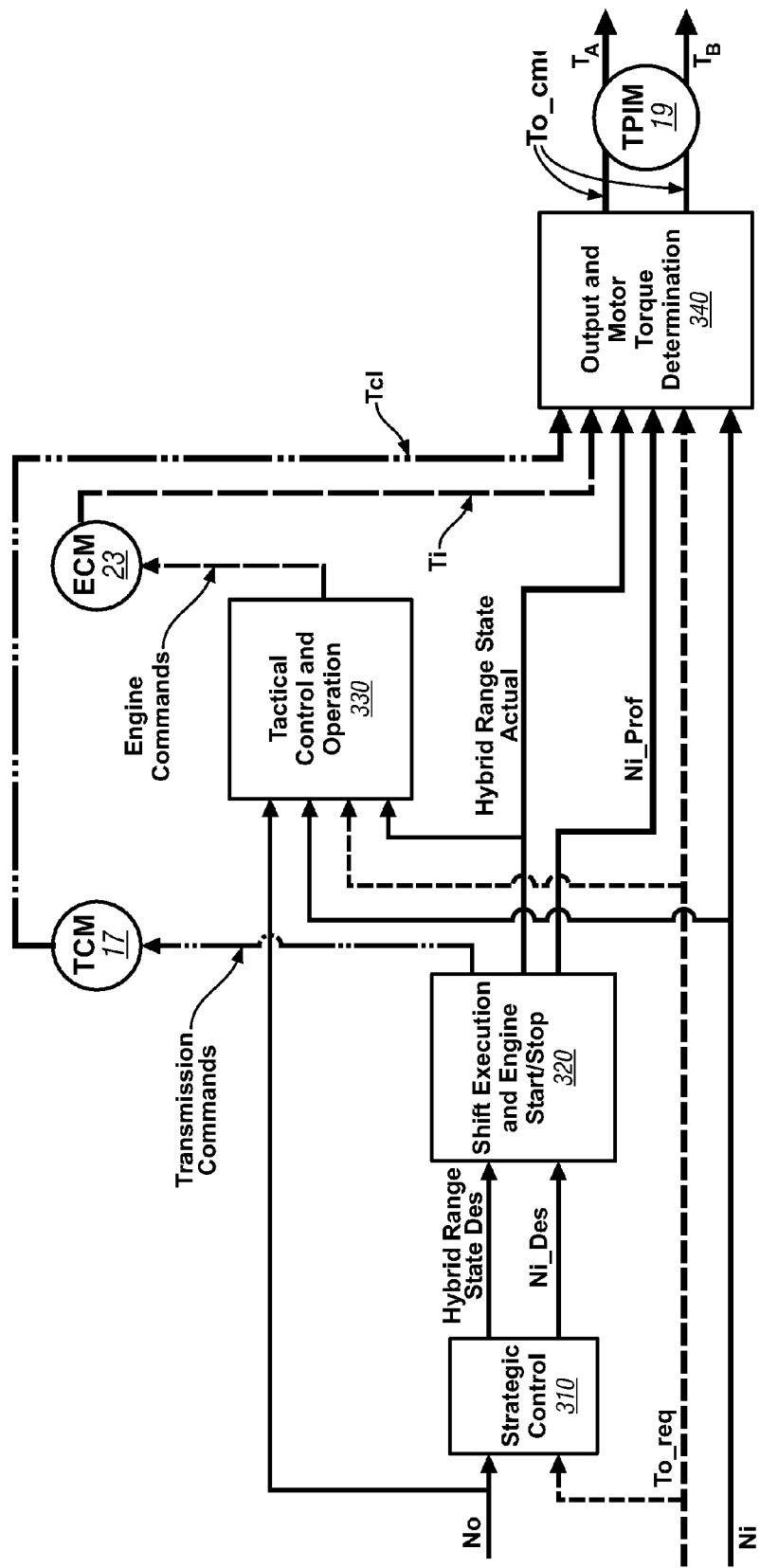
FIG. 3 is a schematic flow diagram of a control system architecture for controlling and managing torque, in a hybrid powertrain system, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque machines and energy storage systems, e.g., hydraulic-mechanical hybrid transmissions using hydraulically powered torque machines (not shown).

The control system architecture of FIG. 3 depicts a flow of pertinent signals through the control modules. In operation, the operator inputs to the accelerator pedal 113 and the brake pedal 112 are monitored to determine the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The output torque request in the form of a predicted accelerator output torque request and a predicted brake output torque request are input to the strategic optimization control scheme 310. The strategic optimization control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include the engine states including one of the all-cylinder state and the cylinder deactivation state wherein a portion of the engine cylinders are deactivated and unfueled, and the engine states including one of the fueled state and the fuel cutoff state. An engine command comprising the preferred input torque of the engine 14 and a present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine a commanded or preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figures 4, 5:
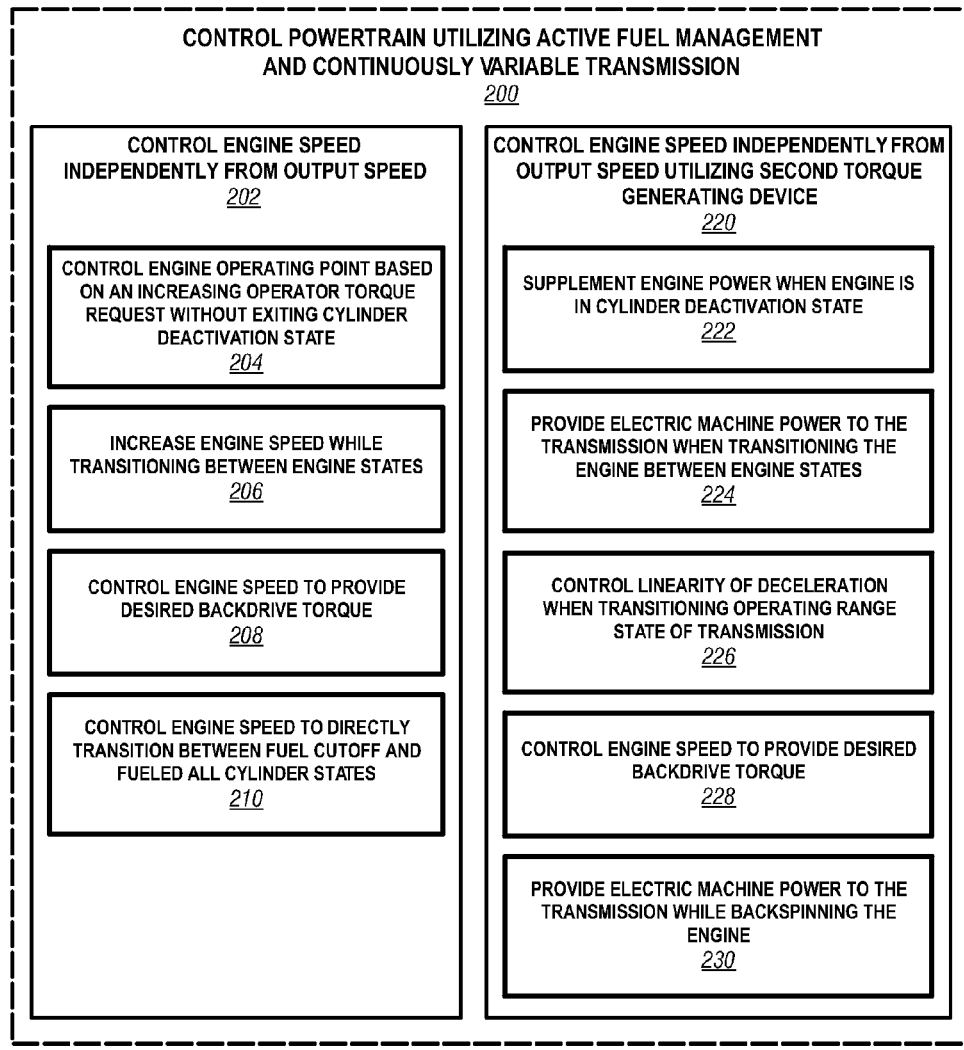
FIG. 4 is a block diagram of a method for controlling mechanical power flow within a hybrid powertrain system, in accordance with the present disclosure.
FIG. 5 is a table correlating output power and effective state of charge with engine state of energy storage device when utilizing a method for controlling mechanical power flow within a hybrid powertrain system, in accordance with the present disclosure.

FIG. 4 depicts a method 200 ('CONTROL POWERTRAIN UTILIZING ACTIVE FUEL MANAGEMENT AND CONTINOUSLY VARIABLE TRANSMISSION') for controlling mechanical power flow within the hybrid powertrain system. The method 200 utilizes control strategies that include controlling the engine state and controlling the input speed $N_I$ from the engine 14 independently from the output speed $N_O$ of the transmission 10 when the transmission 10 is in one of the first and second continuously variable modes M1 and M2. The method 200 can concurrently select a preferred charge state, comprising one of a charging state, a discharging state and a charge-neutral state that governs power flow between the ESD 74 and the first and second electric machines 56 and 72.

The method 200 includes an exemplary control strategy 202 ('CONTROL ENGINE SPEED INDEPENDENTLY FROM OUTPUT SPEED') that manages mechanical power by controlling the input speed $N_I$ from the engine 14 independently from the output speed $N_O$ of the transmission 10 without necessarily utilizing a second torque generating device. The method 200 further includes exemplary control strategy 220 ('CONTROL ENGINE SPEED INDEPENDENTLY FROM OUTPUT SPEED UTILIZING SECOND TORQUE GENERATING DEVICE') that manages mechanical power by controlling both the input speed $N_I$ from the engine 14 independent from the output speed $N_O$ of the transmission 10, and by controlling motor torques $T_A$ and $T_B$ of the first and second electric machines 56 and 72. The method 200 is described in reference to the exemplary electromechanical hybrid powertrain described herein above. Other exemplary hybrid powertrain systems, for example, hybrid powertrain systems having only one electric machine, and hybrid powertrain systems comprising a belt-alternator starter can utilize the method 200. Further, non-hybrid systems having continuously variable transmissions can utilize the control strategy 202.

The control strategy 202 includes determining a preferred engine operating point comprising a preferred engine speed and a preferred engine torque or a preferred engine speed and a preferred engine power based on optimization functions utilizing cost calculations. The control strategy 202 further determines whether to operate the engine in the all-cylinder state or the cylinder deactivation state based on optimization functions utilizing cost calculations. The cost calculations determine costs based on the operator torque request and based on powertrain system efficiencies.

The control strategy 202 continuously determines the preferred engine operating point and the preferred engine operating point is continuously adjusted to provide the preferred input speed $N_I$ and input torque $T_I$ from the engine 14 based on the operator torque request. Therefore, under certain operating conditions in which the operator torque request is increased when the preferred engine state is the cylinder deactivation state, the control strategy 202 determines an engine operating point having a preferred input speed $N_I$ and input torque $T_I$ based on the increasing operator torque request without transitioning the engine 14 to the all-cylinder state ('CONTROL ENGINE OPERATING POINT BASED ON AN INCREASING OPERATOR TORQUE REQUEST WITHOUT EXITING CYLINDER DEACTIVATION STATE') (204).

The control strategy 202 increases input speed $N_I$ from the engine 14 to transition the engine 14 from the cylinder deactivation state to the all-cylinder state while inhibiting noise, vibration, and undesired torque changes ('INCREASE ENGINE SPEED WHILE TRANSITIONING BETWEEN ENGINE OPERATING STATES') (206). Since input speed $N_I$ from the engine 14 can be controlled independently from the output speed $N_O$ from the transmission 10, the output speed $N_O$ from the transmission 10 can be controlled to provide the desired output speed based on the operator torque request while the input speed $N_I$ from the engine 14 is increasing.

The control strategy 202 selects an input speed $N_I$ correlating with a selected backdrive input torque $T_I$, when the vehicle is decelerating and when the engine 14 is in the fuel cut-off state ('CONTROL ENGINE SPEED TO PROVIDE DESIRED BACKDRIVE TORQUE') (208). The backdrive torque can be controlled to minimize spinning power loss through the engine 14 and to provide desired vehicle coastdown characteristics.

The control strategy 202 controls engine speed $N_I$ when the engine 14 is in a fuel cutoff state so that the engine 14 can be directly transitioned from the fuel cut-off state to the fueled, cylinder deactivation state without transitioning to the fueled, all-cylinder state ('CONTROL ENGINE SPEED TO DIRECTLY TRANSISTION BETWEEN FUEL CUTOFF AND FUELED ALL CYLINDER STATES') (210). When operating in the fuel cut-off state, control strategy 202 can operate the engine 14 to provide an engine speed $N_I$ for generating a moderate engine load when the engine 14 is subsequently refueled in the fueled, cylinder deactivation state. Therefore, when the engine 14 transitions from the fuel cutoff state to the fueled, cylinder deactivation state, the engine 14 operates at speed and load conditions to meet the operator torque request while providing a desired drive quality and desirably low levels of noise, vibration and harshness.

Control strategy 220 includes determining the preferred engine state and determining a preferred input speed $N_I$ from the engine 14 that is not directly proportional to a preferred output speed of the transmission 10 when the engine 14 is in one of the continuously variable modes M1 and M2 as described above for control strategy 202. Control strategy 220 further includes controlling motor torques $T_A$ and $T_B$ from the first and second electric machines 56, 72 to communicate tractive torque power flow to and from the transmission 10.

The control strategy 220 transfers mechanical power from the first and second electric machines 56 and 72 to provide power to supplement the engine power when it is desirable to operate the engine 14 in the cylinder deactivation state and when engine power is insufficient to meet the operator torque request (222) ('SUPPLEMENT ENGINE POWER WHEN ENGINE IS IN CYLINDER DEACTIVATION STATE'). For example, during transient acceleration events, power can be transferred from the first and second electric machines 56 and 72 to the engine 14 so that the engine 14 is not required to transition from the cylinder deactivation state to the all-cylinder state to meet the operator torque request and then subsequently transition back to the cylinder deactivation state to provide fuel efficient operation within a short time period. During an exemplary transient acceleration event, 5-15 kW of power is transferred from the first and second electric machines 56 and 72 to the engine 14 for a time period of less than three seconds to supplement the engine power.

The control strategy 220 transfers mechanical power from the first and second electric machines 56 and 72 to the transmission 10 to meet the operator torque request when transitioning the engine state between the cylinder deactivation state and the all-cylinder state ('PROVIDE ELECTRIC MACHINE POWER TO THE TRANSMISSION WHEN TRANSITIONING THE ENGINE BETWEEN ENGINE STATES') (224).

The control strategy 220 maintains linear deceleration of the output speed $N_O$ while inhibiting noise, vibrations and harshness by transferring mechanical power between the transmission 10 and the first and second electric machines 56, 72 when transitioning between operating range states of the transmission 10 ('CONTROL LINEARITY OF DECELERATION WHEN TRANSITIONING OPERATING RANGE STATES OF TRANSMISSION') (226). Deceleration linearity when changing the operating range state of the transmission 10 can be smoothed by continuously adjusting the motor torques $T_A$ and $T_B$ from the first and second electric machines 56 and 72.

The control strategy 220 selects an input speed $N_I$ correlating with a selected backdrive input torque $T_I$ when the engine 14 is in the fuel cut-off state ('CONTROL ENGINE SPEED TO PROVIDE DESIRED BACKDRIVE TORQUE') (228). The backdrive torque can be controlled to minimize power loss and therefore maximize electric power capture during regenerative braking. Further, when the engine 14 is operating in a cylinder deactivation state and a fuel cutoff state, the vehicle is coasting and the operator moderately engages the accelerator pedal 113, e.g., depresses the accelerator pedal 113 less than a threshold amount, the first and second electric machines 56 and 72 can be operated to meet the operator torque request while allowing the engine 14 to remain in the cylinder deactivation and fuel cutoff states.

The control strategy 220 operates the first and second electric machines 56 and 72 to provide motor torques $T_A$ and $T_B$ to the transmission 10 to meet the operator torque request while maintaining the engine 14 in the fuel cut-off and cylinder deactivation states while providing a negative (backspin) engine input speed $N_I$ to the transmission 10 ('PROVIDE ELECTRIC MACHINE POWER TO THE TRANSMISSION WHILE BACKSPINNING THE ENGINE') (230). The control strategy 230 can be utilized when the vehicle speed is too high to operate the vehicle by utilizing an electric propulsion mode. The electric propulsion mode refers to powertrain operation in which the engine 14 is in the engine-off state and only power converted from the first and second electric machines 56 and 72 provides propulsion power.

The method 200 can further control mechanical power flow among the engine 14, a transmission 10, and a second torque generating device (e.g., electric machine 56) vehicle utilizing other exemplary control strategies.

One exemplary control strategy controls the powertrain system to effect a transition from an engine-off state to engine states comprising fueled, cylinder deactivation states. When operating at low loads at low vehicle speeds, the hybrid powertrain can operate in electric propulsion mode. However, the engine 14 powers hydraulic pumps (not shown) to generate hydraulic pressure in a hydraulic valve-deactivation circuit (not shown) to control opening and closing of intake and exhaust valves (not shown) of the engine 14. The hydraulic valve-deactivation circuit is used to facilitate operation in the cylinder deactivation engine state. Thus, when the vehicle is in the electric propulsion mode, hydraulic pressure is not supplied to maintain the intake and exhaust valves in a closed position and therefore, the engine 14 is in the all-cylinder state by default. When exiting the electric propulsion mode, the engine 14 can be started by utilizing the first and second electric machines 56 and 72 to spin the engine from zero rpm to a desired engine speed for operating the engine 14 in the all-cylinder state with fuel cutoff. The first electric machine 56 can spin the engine 14 to power the hydraulic pump to increase hydraulic pressure in the hydraulic valve-deactivation circuit. Entry into the cylinder deactivation state is suspended for a calibratable time period after initiating spinning of the engine 14 so as to allow hydraulic pressure to increase to a sufficient level to operate the engine 14 in the cylinder deactivation state. Preferably after a calibrated time period, the engine 14 can be commanded to operate in the cylinder deactivation state and engine fueling can be commanded to begin. Therefore, by modifying engine speed N, utilizing the first and second electric machines 56 and 72, the engine 14 can operate unfueled and power hydraulic pumps of the hydraulic valve-deactivation circuit, to effect operation in the cylinder deactivation state without first operating in the all-cylinder state during transitioning from the engine-off state to the engine-on state.

FIG. 5 depicts an exemplary control strategy 300 that can be executed within the hybrid powertrain control system to control mechanical power flow, with reference to the exemplary powertrain system described herein. An effective state of charge ('SOCeff (%)') of the ESD 74 can be determined based upon the actual battery state of charge (SOC) as determined by the BPCM 21, preferably comprising a percentage of the actual battery state of charge over the range of available battery power, i.e., $P_{BAT\_MIN}$ to $P_{BAT\_MAX}$. The output power $P_O$ ('Output Power (kW)') from the transmission 10 can be based upon the commanded output torque or directly related to vehicle speed. The effective state of charge SOCeff is utilized to selectively operate the powertrain in a charge state comprising one of the charging mode, the discharging mode, and the charge-neutral mode relative to power flow to and from the ESD 74.

The preferred engine states and preferred powertrain charge states for managing power flow of the ESD 74 are determined utilizing electric power limits, i.e., available battery power range $P_{BAT\_MIN}$ to $P_{BAT\_MAX}$ of the ESD 74, engine fuel-flow (amount of fuel utilized), and costs associated with a power usage ratio. The power usage ratio is preferably a ratio of electric power utilized by the first and second electric machines 56 and 72 and fuel power utilized by the engine 14. The electric power limits, fuel-flow, and power usage ratio are determined as a function of output power $P_O$ and the effective battery state of charge SOCeff. The battery power limits, fuel-flow, and usage ratios are utilized to determine the charge state of the ESD 74 and the engine state of the engine 14. The engine states include the cylinder deactivation state ('4') and the all-cylinder state ('8'). The charge state of the ESD 74 includes the charging state ('C'), the discharging state ('D'), and the charge-neutral state ('N'). When the vehicle is in the electric propulsion mode ('EV') the engine 14 is in the engine-off state and the ESD 74 is in a discharging state. The control strategy 300 can be used to select a preferred engine state and a preferred charge state based upon the effective state of charge SOCeff and the demand for output power, which is generally described in terms of low, moderate, and high output power demand.

The effective state of charge SOCeff controls charging and discharging of the ESD 74, with charging of the ESD 74 suppressed at high vehicle speed to improve fuel economy and effect discharging of the ESD 74. The powertrain can thus take advantage of a subsequent opportunity for energy recovery through regenerative braking at high vehicle speeds, thereby enhancing fuel economy. Although in an exemplary embodiment, the effective state of charge SOCeff is calibrated as a function of output power $P_O$ of the transmission 10, in an alternate embodiment, the effective state of charge SOCeff can be calibrated based on other transmission output operating points, for example output speed $N_O$ of the transmission 10 or output torque $T_O$ of the transmission 10.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling a powertrain system including a multi-cylinder engine coupled to an input member of a hybrid transmission device, the hybrid transmission operative to transfer power between the input member and first and second torque machines and an output member, the first and second torque machines connected to an energy storage device, the engine selectively operative in an all-cylinder state and a cylinder deactivation state, the powertrain selectively operative in one of a plurality of charge states, the method comprising:

monitoring a state of charge of the energy storage device;

determining an effective state of charge based upon the monitored state of charge of the energy storage device and a range of available power from the energy storage device;

determining a preferred output power to the output member; and concurrently selecting a preferred charge state for operating the powertrain and operating the engine in one of the cylinder deactivation state and the all-cylinder state based upon the effective state of charge and the preferred output power to the output member.

2. The method of claim 1, further comprising selecting a preferred charge state comprising one of a charging mode, a discharging mode, and a charge-neutral mode based upon the effective state of charge of the energy storage device and the preferred output power to the output member.

3. The method of claim 2, further comprising selecting one of the charging mode, the discharging mode, and the charge-neutral mode and selecting one of the cylinder deactivation state and the all-cylinder state based upon a predetermined calibration dependent upon the effective state of charge and the preferred output power to the output member.

4. The method of claim 2, further comprising operating the engine in one of an engine-on state and an engine-off state based upon the effective state of charge and the preferred output power to the output member.

5. The method of claim 4, further comprising:
operating the engine in the engine-off state;
operating the first torque machine to transmit torque to the input member to spin the engine unfueled;
operating the second torque machine to transmit tractive torque to the output member based upon the preferred output power to the output member; and
transitioning the unfueled spinning engine to operate in the cylinder deactivation state prior to fueling the spinning engine operating in the cylinder deactivation state and transitioning to the engine-on state.

6. The method of claim 5, further comprising concurrently operating the engine in the cylinder deactivation state and operating the transmission device in the continuously variable operating range state and controlling an output speed of the output member independently of an input speed of the input member.

7. A method for controlling a powertrain system including a multi-cylinder engine coupled to an input member of a hybrid transmission device, the hybrid transmission operative to transfer power between the input member and first and second electric machines and an output member, the first and second electric machines connected to an electrical energy storage device, the engine selectively operative in one of a plurality of engine states and the powertrain selectively operative in one of a plurality of charge states,
the method comprising:
monitoring a state of charge of the electrical energy storage device;
determining an effective state of charge based upon the monitored state of charge of the electrical energy storage device and a range of available power from the electrical energy storage device;
determining a preferred output power to the output member;
concurrently selecting a preferred charge state for operating the powertrain and selecting a preferred engine state for operating the engine based upon the effective state of charge and the preferred output power to the output member; and
controlling operation of the powertrain based upon the preferred engine state, the preferred charge state, and the preferred output power to the output member.

8. The method of claim 7, further comprising selecting preferred engine states comprising one of an engine-on state and an engine-off state, one of a cylinder deactivation state and an all-cylinder state, and one of an engine-fueled state and an engine fuel cut-off state based upon the effective state of charge of the energy storage device and the preferred output power to the output member.

9. The method of claim 8, further comprising selecting a preferred charge state comprising one of a charging mode, a discharging mode, and a charge-neutral mode based upon the effective state of charge and the preferred output power to the output member.

10. The method of claim 9, further comprising:
operating the engine in the engine-off state and the engine fuel cut-off state; and
operating the first electric machine to transmit torque to the input member to spin the engine prior to transitioning the spinning engine to operate in the cylinder deactivation state, and subsequently transitioning the spinning engine operating in the cylinder deactivation state to operate in the engine-on state.

11. The method of claim 9, further comprising selecting one of the charging mode, the discharging mode, and the charge-neutral mode and selecting one of the cylinder deactivation state and the all-cylinder state based upon a predetermined calibration dependent upon the effective state of charge of the energy storage device and the preferred output power to the output member.

12. The method of claim 11, further comprising operating the powertrain in the discharging mode when the effective state of charge is high.

13. The method of claim 12, further comprising operating the engine in the engine-off state when the preferred output power to the output member is in a low range.

14. The method of claim 12, further comprising operating the engine in the cylinder deactivation state when the preferred output power to the output member is in a moderate range.

15. The method of claim 12, further comprising operating the engine in the all-cylinder state when the preferred output power to the output member is in a high range.

* * * * *